United States Patent
Eberhard

(10) Patent No.: US 8,108,924 B1
(45) Date of Patent: Jan. 31, 2012

(54) PROVIDING A FIREWALL'S CONNECTION DATA IN A COMPREHENDIBLE FORMAT

(75) Inventor: Timothy L. Eberhard, Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1104 days.

(21) Appl. No.: 11/753,398

(22) Filed: May 24, 2007

(51) Int. Cl.
*G06F 9/00* (2006.01)
*G06F 9/28* (2006.01)

(52) U.S. Cl. ............. 726/11; 726/12; 726/13; 726/14; 726/15; 716/30; 713/154

(58) Field of Classification Search .............. 726/11–14; 716/30
See application file for complete search history.

(56) References Cited

U.S. PATENT DOCUMENTS

| | | | |
|---|---|---|---|
| 6,772,347 B1 * | 8/2004 | Xie et al. ..................... | 726/11 |
| 6,990,592 B2 * | 1/2006 | Richmond et al. ............ | 726/15 |
| 7,093,280 B2 * | 8/2006 | Ke et al. ....................... | 726/3 |
| 7,159,237 B2 * | 1/2007 | Schneier et al. .............. | 726/3 |
| 7,373,402 B2 * | 5/2008 | Connelly ....................... | 709/224 |
| 7,386,629 B2 * | 6/2008 | Rover et al. ................... | 709/238 |
| 7,596,806 B2 * | 9/2009 | Chen ............................. | 726/11 |
| 7,895,641 B2 * | 2/2011 | Schneier et al. .............. | 726/3 |
| 7,953,014 B2 * | 5/2011 | Toda et al. .................... | 370/242 |
| 2002/0035639 A1 * | 3/2002 | Xu .................................. | 709/238 |
| 2002/0198984 A1 * | 12/2002 | Goldstein et al. ............. | 709/224 |
| 2003/0055968 A1 * | 3/2003 | Hochmuth et al. ........... | 709/226 |
| 2003/0065986 A1 * | 4/2003 | Fraenkel et al. ............... | 714/47 |
| 2003/0154399 A1 * | 8/2003 | Zuk et al. ....................... | 713/201 |
| 2003/0188197 A1 * | 10/2003 | Miyata et al. ................. | 713/201 |
| 2005/0015624 A1 * | 1/2005 | Ginter et al. .................. | 713/201 |
| 2005/0060562 A1 * | 3/2005 | Bhattacharya et al. ....... | 713/200 |
| 2005/0076238 A1 * | 4/2005 | Ormazabal et al. ........... | 713/201 |
| 2006/0174336 A1 * | 8/2006 | Chen ............................. | 726/11 |
| 2006/0288409 A1 * | 12/2006 | Bartal et al. .................. | 726/11 |
| 2007/0162973 A1 * | 7/2007 | Schneier et al. .............. | 726/22 |
| 2008/0060071 A1 * | 3/2008 | Hennan et al. ................ | 726/22 |

OTHER PUBLICATIONS

M.Handley, Internet Dos considerations, Dec. 1, 2006, IETF Trust, IPCOM000144372D, pp. 30-31.*
Chang-Soo Ha, ASIC design of IPsec Hardware accelerator for Network Security, Aug. 4-5 2004, IEEE, pp. 1-3.*

* cited by examiner

*Primary Examiner* — Nathan Flynn
*Assistant Examiner* — Viral Lakhia

(57) ABSTRACT

Techniques are disclosed for providing connection data related to a firewall. In one aspect, computer-readable media provide a method that includes receiving a request for a set of connection parameters of a firewall related to data packets processed by at least one non-CPU device of the firewall. The method further includes identifying raw data of a session table that corresponds to the requested connection parameters. The method additionally includes calculating a result for the requested connection parameters from the raw data, and providing the result in a format detailing a number of connections for each connection parameter.

20 Claims, 4 Drawing Sheets id 10/s12,vsys 0,flag 00200440/4000/03,policy 572,time 1071, dip 0

22(1805):68.30.201.34/1468->63.116.120.115/3100,6,000d65ec4e00,16,vlan 177,tun 0,vsd 0,route 142

14(1804):68.30.201.34/1468<-63.116.120.115/3100,6,000d65ec0900,14,vlan 178,tun 0,vsd 0,route 15 id 21/s**,vsys 0,flag 00000040/4000/03,policy 572,time 1328, dip 0

22(1805):68.29.18.208/49604->205.178.146.50/110,6,000d65ec4e00,16,vlan 177,tun 0,vsd 0,route 141

14(1804):68.29.18.208/49604<-205.178.146.50/110,6,000d65ec0900,14,vlan 178,tun 0,vsd 0,route 15 id 52/s2*,vsys 0,flag 10200440/4000/03,policy 320002,time 47, dip 0

21(0005):68.28.146.11/51396->68.28.15.194/53,17,4001d7029533,19,vlan 114,tun 0,vsd 0,route 10

21(0004):68.28.146.11/51396<-68.28.15.194/53,17,4001d7029533,19,vlan 114,tun 0,vsd 0,route 36 id 85/s**,vsys 0,flag 00000040/4000/03,policy 572,time 1328, dip 0

22(1805):70.8.18.208/1928->71.199.153.34/20253,6,000d65ec4e00,16,vlan 177,tun 0,vsd 0,route 70

14(1804):70.8.18.208/1928<-71.199.153.34/20253,6,000d65ec0900,14,vlan 178,tun 0,vsd 0,route 15

FIG. 2

PROVIDING A FIREWALL'S CONNECTION DATA IN A COMPREHENDIBLE FORMAT

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is defined by the claims below. Embodiments of the present invention solve at least the above problems by providing, among other things, techniques for providing connection data related to a firewall.

In a first aspect, computer-readable media provide a method that includes receiving a request for a set of connection parameters of a firewall related to data packets processed by at least one non-CPU device of the firewall. The connection parameters are selected from a group including at least one of VLANs used on the firewall, routes used on the firewall, virtual firewall systems used on the firewall, and VPN tunnels used on the firewall. The method further includes identifying raw data of a session table that corresponds to the requested connection parameters. The method additionally includes converting the raw data into a textual format, other than a format of the raw data, that describes a result of the requested first set of connection parameters.

In a second aspect, a graphical user interface is provided that includes a first screen area configured to display a plurality of selectable connection parameters. The connection parameters are selected from a group including at least one of VLANs used on a firewall, routes used on the firewall, virtual firewall systems used on the firewall, and VPN tunnels used on the firewall. The graphical user interface also includes a second screen area configured to display results of selected connection parameters, wherein the results are displayed in a textual format other than a raw data format.

In a third aspect, a system is provided that includes a session analyzer component for querying a session table of a firewall for raw data related to a request for connection parameters, converting the raw data into a textual format other than a format of the raw data, and providing the requested connection parameters in the textual format, wherein the requested connection parameters are related to data packets processed by a non-CPU device of the firewall. The system also includes a CPU analyzer component for querying a session table of a firewall for raw data related to a request for connection parameters, converting the raw data into a textual format other than a format of the raw data, and providing the requested connection parameters in the textual format, wherein the requested connection parameters are related to data packets processed by a CPU of the firewall.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 2 illustrates an example of raw data stored in a session table according to an embodiment of the invention.

DETAILED DESCRIPTION

Further, various technical terms are used throughout this description. A definition of such terms can be found in *Newton's Telecom Dictionary* by H. Newton, $21^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
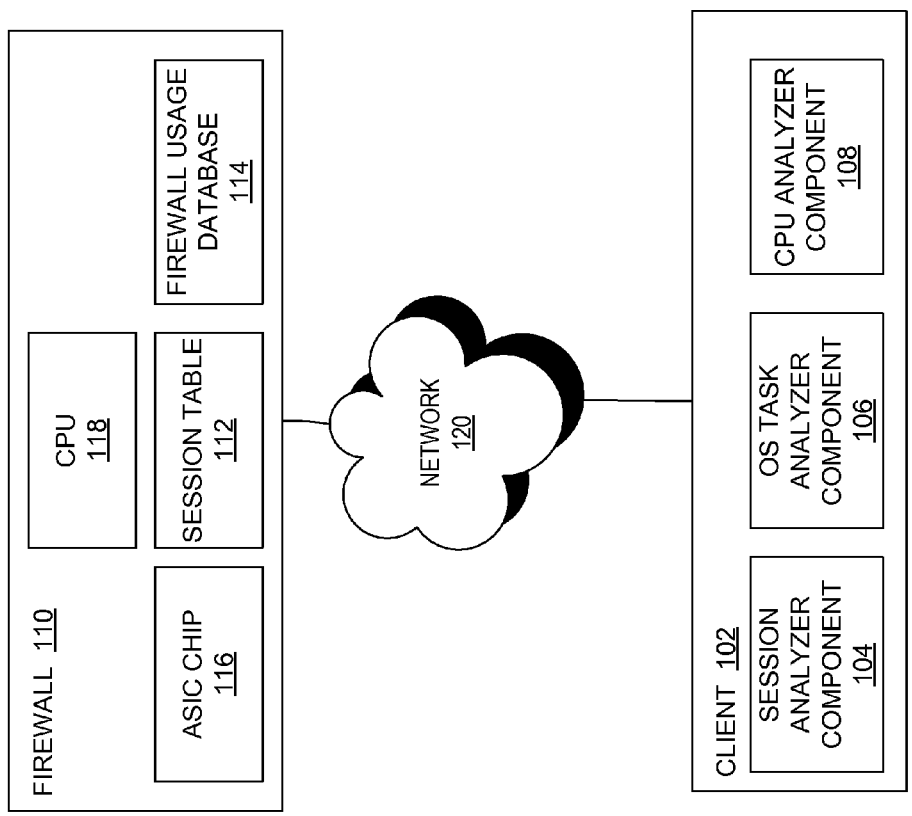
FIG. 1 is a block diagram of an exemplary system for implementing an embodiment of the invention.

FIG. 1 is a block diagram of an exemplary system 100 for implementing an embodiment of the invention. FIG. 1 includes client 102 and firewall 110. Client 102 and firewall 110 can each include a communication interface. The communication interface may be an interface that can allow the client 102 or firewall 110 to be directly connected to any other device or allows the client 102 or firewall 110 to be connected to a device over network 120. Network 120 can include, for example, a local area network (LAN), a wide area network (WAN), or the Internet. In an embodiment, the client 102 or firewall 110 can be connected to another device via a wireless interface through the network 120.

In an embodiment, firewall 110 includes session table 112, firewall usage database 114, one or more application-specific integrated circuit (ASIC) chips 116, and central processing unit (CPU) 118. The ASIC chip 116 generally handles the routing of data packets. The ASIC chip 116 has limited intelligence when handling the routing of data packets and is primarily designed to process traffic as quickly as possible. For example, when a data packet reaches the ASIC chip 116, the ASIC chip will examine the contents of the data packet to determine if the data packet is allowed to be transmitted to its intended destination. If the data packet is allowed to travel to its intended destination, the ASIC chip will proceed to transmit the data packet to the intended destination. However, if it is determined that the data packet is not authorized to travel to its intended destination, the ASIC chip will drop the data packet by preventing it from traveling to its intended destination.

The CPU 118 processes data packets that require advanced processing by the firewall. The CPU 118 usually processes data packets that the ASIC chip is not configured to handle. Generally, the CPU 118 will process data packets that require more processing than just determining whether the data packet is authorized to travel to its intended destination. For example, actions such as creating a new connection and processing a virtual private network (VPN) packet require advanced processing that goes beyond the scope of the capabilities of the ASIC chip 116, such that the CPU 118 is needed to handle the processing of data packets related to such actions.

The session table 112 logs information regarding connections through firewall 110. Generally, a connection is a communication link or session between a client and a server or between a client and another client. The session table 112 logs information regarding connections handled by both the ASIC chip 116 and CPU 118. The information regarding each connection is obtained and logged into the session table 112 by the firewall 110 examining each data packet that flows through each connection.

Each data packet may include information that can inform the firewall 110 about, among other things, a source and destination internet protocol (IP) address of the data packet, a source and destination port of the data packet, a virtual local area network (VLAN) associated with the data packet, a route associated with the data packet, a virtual security device (VSD) associated with the data packet, a VPN tunnel associated with the data packet, and the type of data packet. Since information identifying source and destination IP addresses or port of a data packet is logged into session table 112, by evaluating and/or monitoring the data packets sent from an IP address or port, the session table can also be a resource for determining the connection behavior of data packets transmitted and/or received by an IP address or port. For example, the session table may contain information that, for a particular source IP address, can inform one of the source IP address's connection behavior including the current number of connections the source IP address has, the connections that the source IP address had in the past, the specific destination IP addresses it currently is connected to or has connected to in the past, the manner in which it connects to certain destination IP addresses, what is being done at the destination IP address by a client at the source IP address, and the source and destination ports that the source IP address currently has or had in the past. Similarly, the connection behavior of a source or destination port can be determined from the session table as well.

Additionally, if a connection is handled by a ASIC chip 116, an identifier can be associated and logged with the data packets associated with such a connection within the session table 112. The identifier indicates that each data packet was processed by the respective ASIC chip 116. Similarly, if a connection is handled by the CPU 118, an identifier can be associated and logged with the data packets associated with such a connection within the session table 112, wherein the identifier indicates that each data packet was processed by the CPU 118.

FIG. 2 illustrates an example of raw data stored in a session table 112 according to an embodiment of the invention. As shown, the raw data is in a very cryptic format that the average computer user would not be able to comprehend very well. The average computer user would not be able to look at the raw data and decipher, for example, the top source and destination IP addresses processed by a firewall, the top source and destination ports processed by a firewall, the top used VLANs processed by a firewall, the top routes used by a firewall, the top virtual security devices used by the firewall, the top VPN tunnels used by the firewall, and the type of data packets processed by the firewall.

Firewall usage database 114 stores information regarding the internal processes used by the firewall. Generally, the firewall usage database 114 contains data related to processes the firewall has been using and how much time the firewall has been spending on the used processes. The firewall usage database may contain information such as the most commonly used processes, the recently used processes, and the amount of time the firewall spends on each process. The raw data of the firewall usage database 114 is typically stored in a cryptic format, similar to the session table raw data of FIG. 2, that the average computer user would not be able to comprehend very well. For example, by looking at the raw data of the firewall usage database 114, the average computer user more than likely would not be able to determine which processes the firewall has been using and how much time the firewall has been spending on the used processes.

Client 102 may be or can include a desktop or laptop computer, a network-enabled cellular telephone (with or without media capturing/playback capabilities); wireless email client, or other client, machine or device to perform various tasks including Web browsing; search; electronic mail (email) and other tasks; applications; and functions. Client 102 may additionally be any portable media device such as digital still camera devices, digital video cameras (with or without still image capture functionality), media players such as personal music players and personal video players, and any other portable media device. Furthermore, client 202 may also be or can include a server such as a workstation running the Microsoft Windows®, MacOS™, Unix™, Linux, Xenix™, IBM AIX™, Hewlett-Packard UX™, Novell Netware™ Sun Microsystems Solaris™, OS/2™, BeOS™, Mach™, Apache™, OpenStep™, or other operating systems or platforms.

Client 102 includes session analyzer component 104, operating system (OS) task analyzer component 106, and CPU analyzer component 108. In an embodiment, one or more of components 104, 106, and 108 may be external to client 102 and may reside on a server accessible to the client 102. Session analyzer component 104 is configured to query the session table 112 for raw data related to connection parameters requested by a user. The session analyzer component provides connection parameters based on connections that are not processed by the CPU 118 (non-CPU connections). Such connections are processed by an ASIC chip 116 or a backplane. The session analyzer component 104 includes an application program interface (API) configured to parse the raw data related to the requested connection parameter and convert the raw data into a textual format other than a format of the raw data. The following are the different types of connection parameters that the session analyzer component 104 can determine from the session table 112:

Source IP

The Source IP connection parameter details the number of connections that each source IP address has. The session analyzer component 104 can be configured to create a list of source IP addresses with their respective number of connections. The source IP addresses can be ranked in order from greatest number of connections to least number of connections. The session analyzer component 104 can also be configured to display a list of a top number of source IP addresses with the most connections. The Source IP connection parameter is useful, in one aspect, for troubleshooting a denial of service (DOS) attack or virus infected host.

Destination IP

The Destination IP connection parameter details the number of connections that each destination IP address has. The session analyzer component 104 can be configured to create a list of destination IP addresses with their respective number of connections. The destination IP addresses can be ranked in order from greatest number of connections to least number of connections. The session analyzer component 104 can also be configured to display a list of a top number of destination IP addresses with the most connections. The Destination IP connection parameter is useful, in one aspect, for troubleshooting a denial of service (DOS) attack or virus infected host. Additionally, the Destination IP connection parameter can be used by network administrators to monitor how their network is being used by watching what people connect to.

Source Port

The Source Port connection parameter details the type of ports that each source device or IP address is using. The session analyzer component 104 can be configured to create a list of the different types of source ports used. The source ports can be ranked in order from greatest number of times used to least number of times used. The session analyzer component 104 can also be configured to display a list of a top number of source ports used. The Source Port connection parameter is useful, in one aspect, for locating a worm spreading onto a network, virus attacks, and peer-to-peer connections.

Destination Port

The Destination Port connection parameter details the type of ports that each destination device or IP address is using. The session analyzer component 104 can be configured to create a list of the different types of destination ports used. The destination ports can be ranked in order from greatest number of times used to least number of times used. The session analyzer component 104 can also be configured to display a list of a top number of destination ports used. The Destination Port connection parameter is useful, in one aspect, for locating a worm spreading onto a network, virus attacks, and peer-to-peer connections.

VLANs

The VLAN connection parameter details the different VLANs used in processing the data packets received at the firewall. The session analyzer component 104 can be configured to display a list of a top number of VLANs used in processing data packets received at the firewall. The VLAN connection parameter is useful in determining where traffic is originating, understanding the network load, and in pinpointing the DOS and virus attacks.

Routes

The Route connection parameter details the different routes commonly used in processing data packets through the firewall. The session analyzer component 104 can be configured to display a list of a top number of routes used in processing data packets received at the firewall. The Route connection parameter is useful in analyzing traffic patterns and trends. The connection parameter can also be used in understanding how the network flows and what paths the data is taking. This connection parameter can also help a system administrator optimize the firewall as he/she can eliminate routes from a routing table that are not frequently used.

VSD

Within firewalls such as firewall 110, virtual firewalls can be built to help process connections through the firewall. A VSD is a virtual firewall. The VSD connection parameter details the different VSDs used in processing data packets through the firewall. The session analyzer component 104 can be configured to display a list of a top number of VSDs used in processing data packets received at the firewall. The VSD connection parameter is useful in pinpointing and troubleshooting DOS and virus attacks, understanding firewall usage, capacity planning, trending, and forecasting.

Tunnels

The Tunnel connection parameter details the different VPN tunnels used in processing data packets through the firewall. The session analyzer component 104 can be configured to display a list of a top number of VPN tunnels used in processing data packets received at the firewall. The Tunnel connection parameter is useful in monitoring how much traffic is coming out of each VPN tunnel and the kind of traffic being allowed. VPN tunnels are often made for untrusted networks, so monitoring their usage may be critical.

The session analyzer component 104 can also query the session table 112 to generate various reports requested by a user. One such report is a session overview report. The session overview report is used to output the number of connections the firewall currently has as well as the average number of connections each IP address has managed by the firewall. The information obtained from the session overview report is useful in capacity planning and forecasting.

Another report generated by the session analyzer component 104 from the information within the session table 112 is a hardware usage report. The hardware usage report lets the engineering teams, which are designing the layout and placement of the firewalls, know where the load on current firewalls are in regards to the hardware of the firewall. The hardware of the firewall includes the ASIC chips, the backplane between ASIC chips, and the CPU. The hardware usage report will list the number of connections processed by each ASIC chip, the backplane, and the CPU. This is critical because too much usage of a single hardware device may limit the firewall's throughput. When traffic passes from one ASIC chip to another it will cross the backplane. Traffic across the backplane is usually avoided at all costs. With the hardware usage report, a user can see the amount of traffic crossing each hardware device and can adjust the configuration/port placement to optimize the design of the firewall hardware.

The session analyzer component 104 can also be configured to generate a connection behavior report from the information within the session table 112. The generation of the connection behavior report is an advanced feature that allows a user to zoom in on a specific area of interest such as a particular IP address, port, or protocol. For example, if a system administrator has found a suspect IP address or port, he/she can enter in the name of the IP address or port and the session analyzer component 104 will return filtered data based upon that entry. The filtered data corresponds to the connection behavior of the IP address or port. For example, the session table may contain information that, for a particular source IP address, can inform a user of the current number of connections the source IP address has, the connections that the source IP address had in the past, the specific destination IP addresses it currently is connected to or has connected to in the past, the manner in which it connects to certain destination IP addresses, what is being done at the destination IP address by a client at the source IP address, and the source and destination ports that the source IP address currently has or had in the past. Similarly, the connection behavior of a source/destination port or for a particular protocol can be determined from the session table as well.

OS task analyzer component 106 is configured to query the firewall usage database 114 for raw data related to a firewall usage request by a user. The OS task analyzer component 106 includes an API that is configured to parse database 114 and convert the raw data, related to the requested firewall usage, into a textual format other than the format of the raw data. The OS task analyzer will typically retrieve information regarding which processes the firewall has been using and how much time the firewall has been spending on the used processes.

CPU analyzer component 108 is configured to query the session table 112 for raw data related to connections processed by the CPU. The CPU analyzer component 108 includes an API configured to parse the session table 112 and convert the raw data, related to a user's information request, into a textual format other than the format of the raw data. The CPU analyzer component 108 can provide the same connection parameters as the session analyzer component 104, however, the connection parameters provided by the CPU analyzer component are based solely on the connections processed by the CPU 118.

Figure 3:
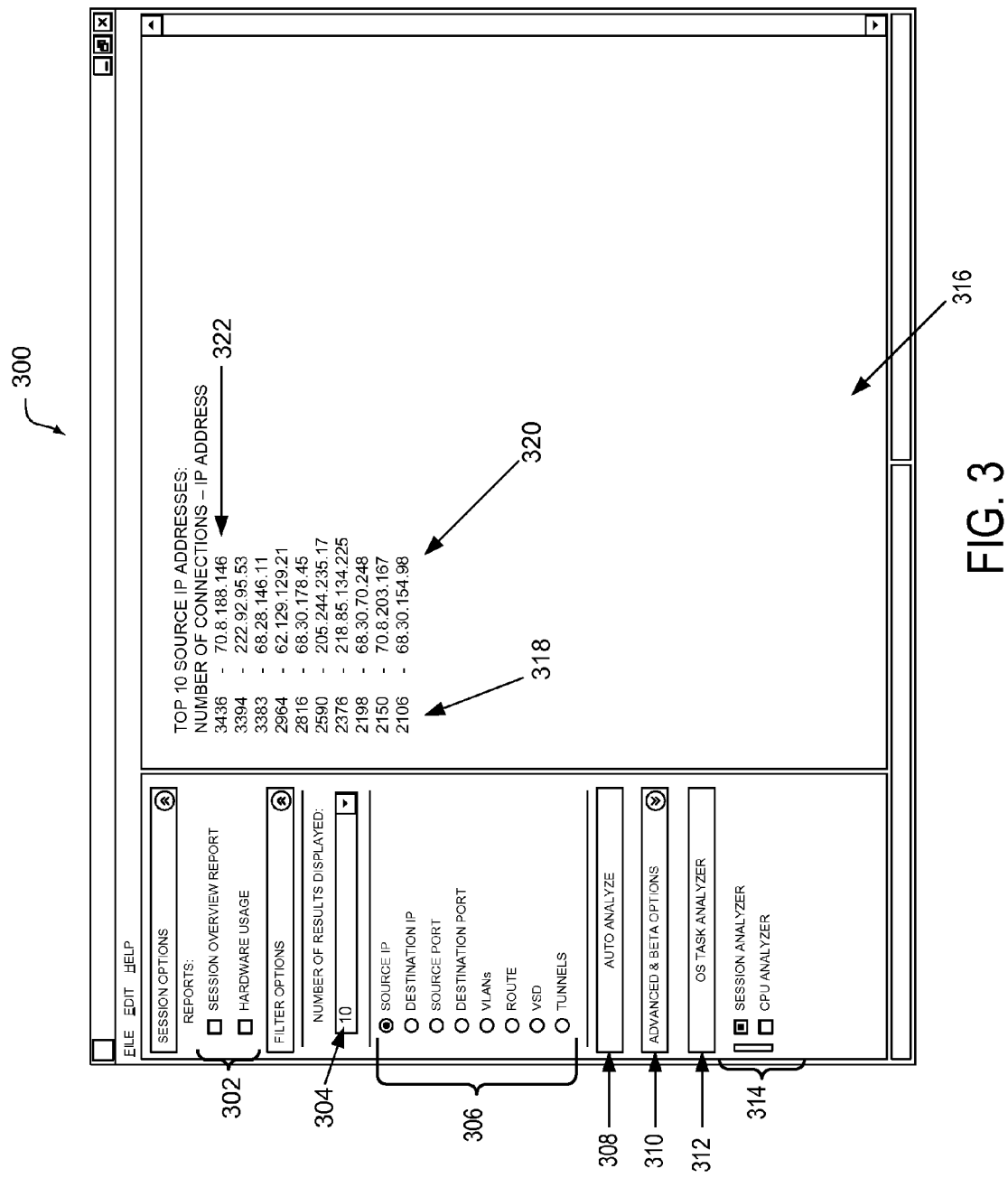
FIG. 3 is an embodiment of an exemplary graphical user interface (GUI) for displaying firewall connection data in a textual format according to an embodiment of the invention.

FIG. 3 is an embodiment of an exemplary graphical user interface (GUI) 300 for displaying firewall connection data in a textual format according to an embodiment of the invention. GUI 300 includes a first screen area 302 that is configured to allow users to run a report against a firewall. In an embodiment, a user can select either a session overview report or a hardware usage report to be run against the firewall. GUI 300 also includes a second screen area 306 that is configured to allow users to select one or more connection parameters that he/she would like retrieved from the firewall. As shown, the Source IP connection parameter is selected. GUI 300 also includes a third screen area 304 that is configured to allow users to select a number of top results that he/she would like displayed for each selected connection parameter. As shown, the user has requested the top 10 results for the Source IP connection parameter.

GUI 300 also includes a fourth screen area 308 that is configured to allow a user to select to retrieve "auto analyze" output from the firewall. The auto analyze selection outputs a predetermined top number of results for all of the connection parameters. In an embodiment, the auto analyze selection can output a predetermined top number of results for less than all of the connection parameters. The predetermined top number can be set by a system administrator or any other user. For example, the auto analyze selection can be configured to output the top 5 results for all of the connection parameters within screen area 306 without the user having to select each parameter.

Additionally, GUI 300 can include a fifth screen area 310 that is configured to allow a user to select advanced features for retrieving information regarding the firewall. The generation of the connection behavior report is an advanced feature that allows a user to zoom in on a specific area of interest such as a particular IP address, port, or protocol. By selecting the advanced feature option, a user can obtain the connection behavior of either an IP address, port, or protocol as described previously above.

Furthermore, the GUI 300 can include a sixth screen area 312 that is configured to allow a user to obtain the output from the OS task analyzer. Again, the OS task analyzer will typically retrieve information from the firewall usage database 114 regarding which processes the firewall has been using and how much time the firewall has been spending on the used processes. The GUI 300 can also include a seventh screen area 314 that is configured to allow a user to select between receiving firewall information from a session analyzer component and CPU analyzer component. By selecting the session analyzer, a user can obtain connection parameter information based on data packets processed by non-CPU hardware such as the ASIC chips and the backplane. By selecting the CPU analyzer, the user can obtain connection parameter information based on data packets processed by the CPU. As shown, the user has selected the session analyzer.

Moreover, the GUI 300 can include an eighth screen area 316 that is configured to display the results of the selections made in the first through seventh screen areas of the GUI 300. The results will be displayed in a textual format other than a format of the raw data found in the session table 112 and firewall usage database 114. Generally, the textual format will describe the results of a request from a user and will be a format that the average computer user can better comprehend than the raw data format of the session table 112 and firewall usage database 114. Based on the selections made in screen areas 304, 306, and 314, the top 10 source IP addresses for connections processed by non-CPU hardware are shown in screen area 316. Column 318 shows the number of connections in a descending order, and column 320 shows the corresponding source IP addresses for each number of connections. For example, as shown in example 322, the top source IP address 70.8.188.146 has 3,436 connections.

Figure 4:
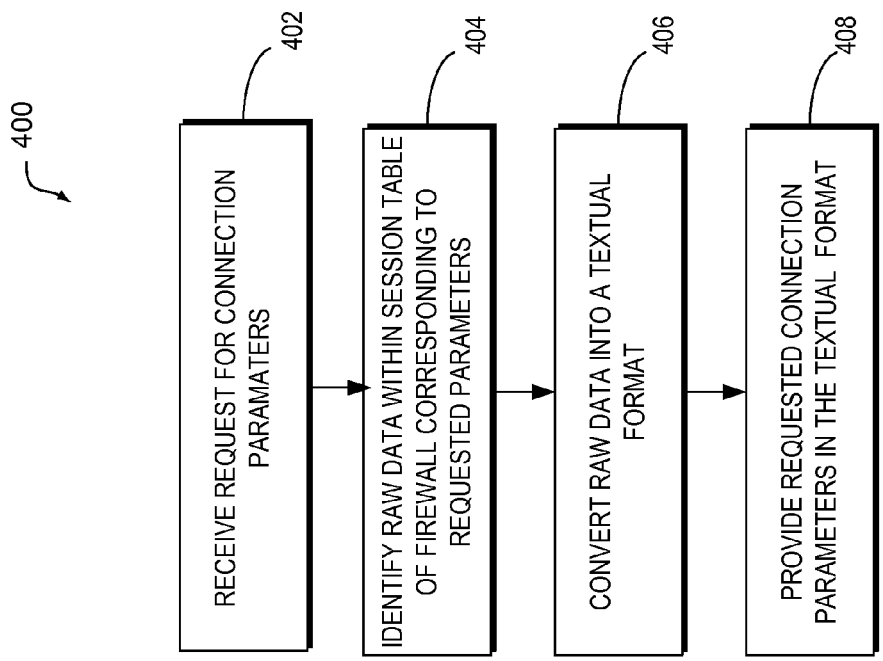
FIG. 4 is a flow diagram of an embodiment of a method for providing firewall connection data in a textual format according to an embodiment of the invention

FIG. 4 is a flow diagram of an embodiment of a method 400 for providing firewall connection data in a textual format according to an embodiment of the invention. At operation 402, a request for connection parameters is received. In an embodiment, the request may be received by a session analyzer component that can process the request for connection parameters related to data packets processed by non-CPU devices of the firewall. In another embodiment, the request may be received by a CPU analyzer component that can process the request for connection parameters related to data packets processed by the CPU of the firewall. At operation 404, raw data is identified within a session table of the firewall, wherein the raw data corresponds to the requested connection parameters. At operation 406, the raw data is converted into a textual format. An API of either the session analyzer or CPU analyzer component is configured to parse the raw data and convert the raw data into the textual format other than a format of the raw data. At operation 408, the requested connection parameters are provided in the textual format.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-useable instructions embodied thereon for performing a method of providing connection data related to a firewall, the method comprising:
    storing in a session table a log of the connection data, wherein the connection data are associated with connections through the firewall and are logged into the session table by the firewall, wherein storing the log of the connection data includes distinguishing between connection data processed by one or more non-CPU devices in the firewall and connection data processed by one or more CPU devices in the firewall by storing the connection data processed by the one or more non-CPU devices with a non-CPU identifier and storing the connection data processed by the one or more CPU devices with a CPU identifier, and wherein the firewall includes at least one non-CPU device and at least one CPU device;
    displaying selectable connection parameters of a firewall, wherein the selectable connection parameters provide actual usage information about data packets processed by the firewall, and wherein the selectable connection parameters include
        (A) a VLAN connection parameter that provides actual usage information about VLANs used with the firewall,
        (B) a routes connection parameter that provides actual usage information about routes used in processing data packets through the firewall,
        (C) a virtual firewall systems connection parameter that provides actual usage information about virtual firewall systems used with the firewall, and
        (D) a VPN tunnels connection parameter that provides actual usage information about VPN tunnels used with the firewall;
    receiving a first request for a first set of one or more connection parameters of the firewall that are selected from the selectable connection parameters;
    providing a session analyzer, wherein when the first set of one or more connection parameters of the firewall are related to data packets processed by the one or more non-CPU devices of the firewall, the session analyzer queries the session table for raw data related to data packets processed by the one or more non-CPU devices of the firewall that are identified by the non-CPU identifier;
    providing a CPU analyzer, wherein when the first set of one or more connection parameters of the firewall are related to data packets processed by the one or more CPU devices of the firewall, the CPU analyzer queries the session table for raw data related to data packets processed by the one or more CPU devices of the firewall that are identified by the CPU identifier;
    providing an operating system (OS) task analyzer, wherein when the first set of one or more connection parameters of the firewall are related to internal processes used by the firewall, the OS task analyzer queries a firewall usage database for processes the firewall has been using and an amount of time the firewall has been spending on the processes;
    by way of at least one of the session analyzer, the CPU analyzer, or the OS task analyzer, identifying raw data of the session table or a firewall usage database that correspond to the requested first set of one or more connection parameters, said raw data including,
        an undesirable portion of information that is not relevant to a display format for presenting the first set of one or more connection parameters on a presentation device; and
        a desirable portion of information that is relevant to the display format for presenting the first set of one or more connection parameters on the presentation device,
    calculating a result for the requested first set of one or more connection parameters based on the raw data; and
    presenting a presentation based on the result in the display format detailing at least one of
        (A) the one or more connection parameters and a corresponding number of connections for each of the one or more connection parameters, or
        (B) the processes the firewall has been using and how much time the firewall has been spending on the processes,
    wherein said presentation does not include said undesirable portion of information.

2. The media according to claim 1, wherein the method further comprises:
    receiving, within the request, a number representing a top number of results for each of the requested connection parameters; and
    analyzing the session table to calculate the top number of results; and
    providing the calculated top number of results for each of the one or more requested connection parameters in the display format.

3. The media according to claim 1, wherein the method further comprises:
    analyzing the session table to calculate a session overview report, the session overview report comprising at least one of a total number of connections the firewall currently has and an average number of connections per IP address; and
    providing the session overview report.

4. The media according to claim 1, wherein the method further comprises:
    analyzing the session table to calculate a hardware usage report, the hardware usage report comprising a number of connections handled by one or more hardware devices of the firewall; and
    providing the hardware usage report in a format detailing the hardware device and a corresponding number of connections for the hardware device.

5. The media according to claim 1, wherein the method further comprises:
    analyzing the session table to calculate a connection behavior of at least one of an IP address, a port, and a protocol; and
    providing the connection behavior.

6. The media according to claim 1, wherein the method further comprises:
    analyzing the firewall usage database to calculate one or more internal processes used by the firewall; and
    providing the one or more used internal processes in a format detailing the one or more internal processes and a corresponding amount of time spent by the firewall on each internal process.

7. The media according to claim 1, wherein the method further comprises:
  receiving a second request for a second set of one or more connection parameters of the firewall related to data packets processed by a CPU of the firewall, the second set of one or more connection parameters selected from a second connection parameter group including at least one of VLANs used with the firewall, routes used with the firewall, virtual firewall systems used with the firewall, and VPN tunnels used with the firewall;
  identifying raw data of the session table that corresponds to the requested second set of one or more connection parameters, said raw data including,
    (A) an undesirable portion of information that is not relevant to the display format for presenting the first set of one or more connection parameters on a presentation device; and
    (B) a desirable portion of information that is relevant to the display format for presenting the first set of one or more connection parameters on a presentation device,
  calculating a result for the requested second set of one or more connection parameters based on the raw data; and
  presenting a presentation based on the result in the display format detailing the one or more connection parameters and a corresponding number of connections for each of the one or more connection parameters, wherein said presentation does not include said undesirable portion of information.

8. The media according to claim 7, wherein the method further comprises:
  analyzing the session table database to determine one or more types of data packets within the session table; and
  providing the determined one or more types of packets in a format detailing the type of packet and a corresponding number of times the packet type has been processed by the CPU.

9. A graphical user interface embodied on one or more non-transitory computer-readable media and executable on a computer for presenting on a display screen connection data related to a firewall, the graphical user interface comprising:
  a first screen area configured to display a plurality of selectable firewall connection parameters that provide actual usage information about data packets processed by the firewall,
  the firewall connection parameters selected from a connection parameter group that includes at least one of:
    (A) a VLAN connection parameter that provides actual usage information about VLANs used with a firewall,
    (B) a routes connection parameter that provides actual usage information about routes used with the firewall,
    (C) a virtual firewall systems connection parameter that provides actual usage information about virtual firewall systems used with the firewall, or
    (D) a VPN tunnels connection parameter that provides actual usage information about VPN tunnels used with the firewall; a second screen area configured to display one or more results of selecting one or more of the firewall connection parameters from the first screen area, the one or more results being obtained from raw data of a session table that includes a log of the connection data,
  wherein the results are obtained by at least one of a session analyzer or a CPU analyzer, and wherein the results are displayed in a format detailing a number of connections for each of the one or more selected firewall connection parameters, the raw data including,
    (A) an undesirable portion of information that is not relevant to a display format for presenting the first set of one or more connection parameters on a presentation device, and
    (B) a desirable portion of information that is relevant to the display format for presenting the first set of one or more connection parameters on a presentation device, wherein the one or more results do not include the undesirable portion of information;
  wherein the session analyzer queries the session table for raw data related to data packets processed by one or more non-CPU devices of the firewall; and
  wherein the CPU analyzer queries the session table for raw data related to data packets processed by one or more CPU devices of the firewall.

10. The graphical user interface according to claim 9, further comprising a third screen area configured to display one or more selectable reports, the one or more selectable reports being selected from a group including at least one of a session overview report and a hardware usage report.

11. The graphical user interface according to claim 10, wherein results of the one or more selectable reports are displayed in the second screen area.

12. The graphical user interface according to claim 9, further comprising a fourth screen area configured to display an input box for inputting a number of results desired to be displayed for each of the one or more selected firewall connection parameters.

13. The graphical user interface according to claim 9, further comprising a fifth screen area configured to display a selectable option for toggling between receiving firewall connection parameter data related to data packets processed by at least one CPU device of the firewall and receiving firewall connection parameter data related to data packets processed by at least one non-CPU device of the firewall.

14. The graphical user interface according to claim 9, further comprising a sixth screen area configured to display a selectable option retrieving a top number of internal processes used by the firewall.

15. The graphical user interface according to claim 14, wherein the top number of used internal processes are displayed in the second screen area.

16. A system for providing connection data related to a firewall, comprising:
  a computing device associated with one or more processors and one or more computer-storage media;
  a data store coupled with the computing device;
  a session table of a firewall, stored in a database in the data store, that logs information regarding actual usage information for connections through the firewall as raw data, wherein the session table distinguishes between information processed by non-CPU devices in the firewall and CPU devices in the firewall by logging non-CPU identifiers with information associated with data packets processed by non-CPU devices in the firewall and logging CPU identifiers with information associated with data packets processed by CPU devices in the firewall;
  a session analyzer component for querying that queries the session table of the firewall for raw data related to a first request for one or more connection parameters, calculating a result for the one or more requested connection parameters based on the raw data, and presenting the result in a format detailing a number of connections for each of the one or more connection parameters, wherein the one or more requested connection parameters are related to data packets processed by the non-CPU device of the firewall that are identified by the non-CPU identifier;

a CPU analyzer component that queries the session table of the firewall for raw data related to a second request for one or more connection parameters, calculating a result for the one or more requested connection parameters based on the raw data, and presenting the result in a format detailing a number of connections for each of the one or more connection parameters, wherein the one or more requested connection parameters of the second request are related to data packets processed by the CPU of the firewall that are identified by the CPU identifier; and wherein the session analyzer component and the CPU analyzer component analyze the session table to calculate a connection behavior of at least one of an IP address, a port, and a protocol, and wherein the connection behavior includes a current number of connections through the firewall associated with the at least one of the IP address, the port, or the protocol.

17. The system according to claim 16, further comprising an operating system task analyzer component for querying a firewall usage database for raw data related to a number of internal processes used by the firewall, calculating a result for the internal processes based on the raw data, and presenting the result in a format detailing an amount of time spent by the firewall for each internal process.

18. The system according to claim 16, further comprising a graphical user interface for selecting the session analyzer component, the CPU analyzer component, and the operating system task analyzer component, and for displaying one or more results of at least one component.

19. The system according to claim 16, wherein the one or more connection parameters includes at least one of VLANs used with a firewall, routes used with the firewall, virtual firewall systems used with the firewall, or VPN tunnels used with the firewall.

20. The system according to claim 18, wherein the graphical user interface comprises a screen area that includes an auto analyze feature for outputting a predetermined top number of results for each of the one or more connection parameters without a user having to select a connection parameter.

* * * * *